(12) United States Patent
Matiushkin et al.

(10) Patent No.: US 11,562,024 B2
(45) Date of Patent: Jan. 24, 2023

(54) METHOD AND SYSTEM FOR TRAVERSING AN OBJECT GRAPH USING TRAVERSAL CONTEXT OBJECTS

(71) Applicant: INTUIT INC., Mountain View, CA (US)

(72) Inventors: Aleksandr Matiushkin, Sunnyvale, CA (US); Ajay Gupta, Cupertino, CA (US); Grigoriy Kesler, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 265 days.

(21) Appl. No.: 16/879,940

(22) Filed: May 21, 2020

(65) Prior Publication Data

US 2021/0365499 A1    Nov. 25, 2021

(51) Int. Cl.
| | | |
|---|---|---|
| *G06F 16/901* | (2019.01) | |
| *G06F 16/903* | (2019.01) | |
| *G06F 16/28* | (2019.01) | |
| *G06F 16/9038* | (2019.01) | |
| *G06F 9/54* | (2006.01) | |

(52) U.S. Cl.
CPC .......... *G06F 16/9024* (2019.01); *G06F 9/546* (2013.01); *G06F 16/289* (2019.01); *G06F 16/9038* (2019.01); *G06F 16/90335* (2019.01)

(58) Field of Classification Search
CPC ............... G06F 16/289; G06F 16/9024; G06F 16/90335; G06F 16/9038; G06F 9/546
See application file for complete search history.

(56) References Cited

U.S. PATENT DOCUMENTS

| | | | |
|---|---|---|---|
| 7,376,658 B1 * | 5/2008 | Bumgarner | G06F 16/289 707/999.1 |
| 2008/0177759 A1 * | 7/2008 | Sodhi | G06F 16/80 |
| 2016/0306896 A1 * | 10/2016 | Paradies | G06F 16/90335 |

* cited by examiner

Primary Examiner — Richard L Bowen
(74) Attorney, Agent, or Firm — Patterson + Sheridan, LLP

(57) ABSTRACT

Certain aspects of the present disclosure provide techniques for enumerating relationships in an object graph using traversal context objects that are decoupled from the implementation details of an object graph and the objects stored therein. An example method generally includes receiving a request to traverse an object graph, the object graph including a plurality of objects. A root context object is generated, and a traversal context object associated with a root node of the object graph is generated. The traversal context object is linked to the root context object and added to a traversal data structure. The graph is traversed by adding and removing traversal context objects to and from the traversal data structure until a terminating event occurs.

18 Claims, 4 Drawing Sheets

METHOD AND SYSTEM FOR TRAVERSING AN OBJECT GRAPH USING TRAVERSAL CONTEXT OBJECTS

INTRODUCTION

Aspects of the present disclosure relate to traversing graph data structures, and more specifically to traversing a graph by decoupling the traversal from the structure of objects in the graph using implementation-independent traversal context objects.

BACKGROUND

Graphs are generally non-linear data structures including nodes (or vertices) and edges connecting the nodes. The nodes may represent various values within the graph, such as scalar values, objects, schema definitions, and the like. Edges may represent connections between the nodes in the graph. These connections may be directional such that a path through the graph may only be performed according to the direction of each connection between nodes, multidirectional such that a node in the graph refers to another node in the graph multiple times, or non-directional such that a path through the graph may be found using connections between any pair of nodes. Some of these graphs may be object graphs, in which relationships between different objects (or different instances of objects) in a software application may be represented by edges connecting nodes representing different objects.

To learn about the content of a graph, a graph may be traversed using various methods. A depth-first traversal may traverse a graph starting from some node and exploring deeper nodes along a path in the graph until no further nodes are found. A breadth-first traversal may traverse a graph by examining information about the nodes at each level of the graph until the deepest nodes in the graph are reached. Regardless of whether a graph is traversed using depth-first traversal or breadth-first traversal, code for traversing a graph may be tightly coupled to the definition of the graph or the objects included in the graph. Thus, traversal code may generally be written independently as implementation-dependent code for each graph based on the definition of the graph and/or the objects included in the graph, which may increase the amount of code to be developed and tested. Further, some code components may be shared, which may further complicate the maintainability of code for traversing various graphs within an application, as changes to a code component replicated across different traversal mechanisms may need to be propagated across multiple locations within the code base of the application.

Thus, techniques are needed for implementation-independent traversal of object graphs.

BRIEF SUMMARY

Certain embodiments provide a computer-implemented method for enumerating relationships between objects in an object graph. The method generally includes receiving a request to traverse an object graph, the object graph including a plurality of objects. A root context object is generated, and a traversal context object associated with a root node of the object graph is generated. The traversal context object is linked to the root context object and added to a traversal data structure. The graph is traversed by adding and removing traversal context objects to and from the traversal data structure until a terminating event occurs.

Other embodiments provide a system comprising a processor and a computer-readable memory storing instructions that, when executed by the processor, perform an operation for enumerating relationships between objects in an object graph. The operation generally includes receiving a request to traverse an object graph, the object graph including a plurality of objects. A root context object is generated, and a traversal context object associated with a root node of the object graph is generated. The traversal context object is linked to the root context object and added to a traversal data structure. The graph is traversed by adding and removing traversal context objects to and from the traversal data structure until a terminating event occurs.

Still further embodiments provide a computer-implemented method for enumerating relationships between objects in an object graph. The method generally includes receiving a request to traverse an object graph. The object graph generally includes a plurality of objects, and the request generally includes a specification of a discovery mechanism defining functions for processing objects discovered in the object graph based on a context of the discovered objects and initial set of context variables for traversing the object graph. A root context object and a traversal context object associated with a root node of the object graph are generated. The traversal context object is linked to the root context object and added to a traversal data structure. The graph is traversed by adding and removing traversal context objects to and from the traversal data structure until a terminating event occurs. To traverse the graph, one or more defined functions in the discovery mechanism are performed with respect to each respective object in the traversal data structure. Upon determining that the respective object has a pre-order traversal context, one or more children objects are discovered in the object graph, traversal context objects are generated for the discovered traversal context objects, and the generated traversal context objects are added to the traversal data structure.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
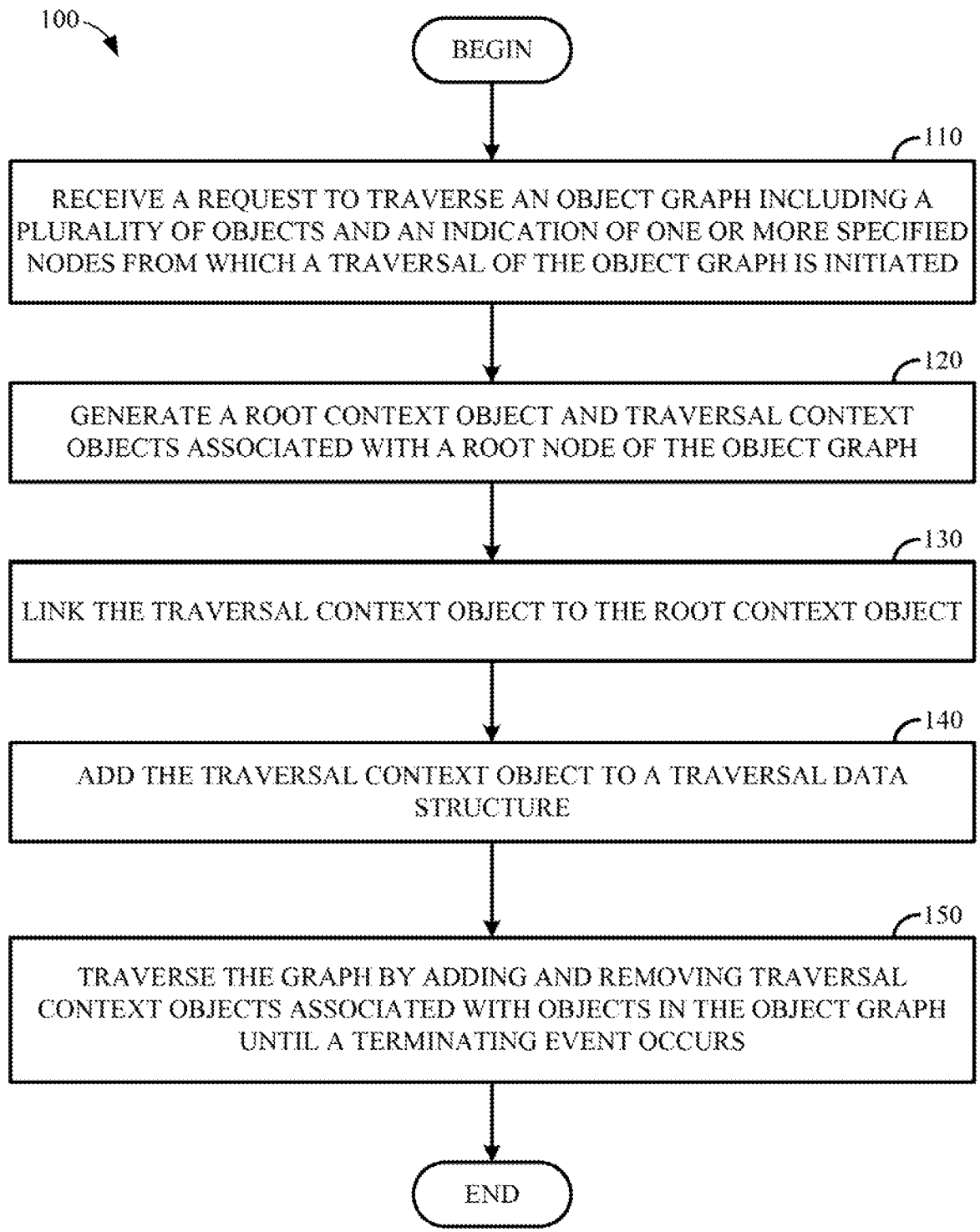
FIG. 1 illustrates example operations for enumerating relationships between objects in an object graph using traversal context objects.

Graph traversal is a technique used to enumerate relationships between data in a graph data structure. Generally, relationships in a graph may be defined as edges connecting different nodes (or vertices) in the graph. Graph data structures may be custom-built to support custom-designed objects, which may result in a need to maintain dedicated traversal code for each graph included in or otherwise used by an application.

While some generic techniques may allow for specific forms of graph traversal, these techniques may not be broadly applicable. For example, graph traversal may be performed using call stack recursion. Using call stack recursion, a depth-first search of a graph may be performed, as the nature of such an operation causes additional objects along a specific path to be pushed onto a stack until no further objects can be identified from that path. However, performing a breadth-first search of a graph using call stack recursion may not be possible, as a breadth-first search identifies nodes at a specific level of a graph, regardless of which path a node belongs to, until no nodes are found. That is, the terminating event of a recursion call (e.g., where a child node reference resolves to NULL) may not occur at a given level of a graph, and thus, a traversal using call stack recursion may look at deeper levels of a graph before identifying each node at a specific level of the graph.

In another example, push-down automata may be used to traverse a graph. However, algorithms implementing push-down automata may be specific to a particular graph structure. For example, these algorithms may use statically defined or hardcoded methods for deriving a next set of nodes from a current node in the graph, which may result in a graph data structure that is specific to the graph and the objects.

Embodiments of the present disclosure provide techniques for traversing an object graph and enumerating relationships between objects in the object graph independently of the structure and definition of the object graph and the objects stored in such a graph using traversal context objects.

Generally, an object graph may be a data structure in which relationships between objects stored in the graph are maintained. The object graph may include objects of the same or different types. For example, the object graph may be structured such that nodes in the object graph serve as containers for a generic object (e.g., in the Java programming language, serve as containers for any object that inherits the "Object" class in the java.lang package) or containers for a specified user-defined type of object. An object graph may include a collection of nodes, and each node representing an object may include references to its child nodes representing child objects.

Generally, an initial traversal context object may be created for a specified node in the object graph, which may correspond to an initial node from which a graph traversal is to be performed. The initial node may be a root node of the object graph (such that the entire object graph is traversed) or some other node in the object graph (such that a portion of the object graph, or a subgraph, is traversed). Additional traversal context objects may be created and linked to the traversal context object associated with the initial node, and a function provided to a traversal system may be used to identify nodes in the object graph. Generally, each traversal context object may encapsulate an object from the object graph and include other information that maintains information about local variables associated with the object and references to a parent traversal context object.

By using traversal context objects to traverse object graphs, traversal of an object graph may be decoupled from the implementation of the object graph and the objects stored therein. Because the traversal context object encapsulates objects from the object graph specific implementation details of the objects may be abstracted away from traversal of the graph. Each traversal context object, as discussed in further detail below, may include references to other traversal context objects encapsulating other objects within the object graph. A single code base can traverse the graph and enumerate relationships between objects in the graph iteratively without needing to know the specific details of the functions that need to be called within a specific object graph to reach other nodes in the object graph or needing to know the specific structure of objects in the object graph to extract data relevant to the traversal.

Consequently, traversal context objects and the traversal mechanisms described herein may be reused for traversal of graphs regardless of the implementation details of the graph. The traversal context objects may also enforce type safety (e.g., to prevent runtime errors arising from performing operations with respect to incompatible primitive types or objects) during graph traversal and the enumeration of relationships between objects in an object graph. Finally, the traversal techniques discussed herein may efficiently traverse cyclic graphs (e.g., graphs in which the first node and the last node are identical) by identifying repetitions of objects in the graph, which may accelerate the process of graph traversal.

Example Traversal of an Object Graph Using Traversal Context Objects

FIG. 1 illustrates example operations 100 that may be performed by a system to traverse an object graph using traversal context objects. Operations 100 may be performed by a computing system (e.g., system 400 illustrated in FIG. 4) on which application code executes. Code for executing operations 100 may be deployed on a computing system, for example, as a library shared among multiple applications, within application code, referenced using remote procedure calls, or the like.

As illustrated, operations 100 begin at block 110, where a system including an object graph traverser receives a request to traverse an object graph and an indication of one or more specified nodes from which a traversal of the object graph is initiated. The object graph may be stored in persistent storage (e.g., in an object graph data store on the system or remote from the system) and may be loaded, at least partially, into system memory for traversal and analysis, as discussed above.

As discussed, an object graph may generally be a data structure in which relationships between objects stored in the graph are maintained based on connections between nodes representing different objects in the graph. These connections may be structured, for example, as references (e.g., memory pointers, a node identifier, etc.) to another node in the object graph. The references may be, for example, memory pointers to the child nodes, a name reference to the child nodes, or the like. If a node in the object graph does not have any child nodes, the references to child nodes may be the null set. In some cases, nodes in the graph may not reference child nodes; instead, a child retrieval function defined for the object graph may use external knowledge, defined a priori, to identify children nodes of a given node in the object graph.

The indication of the one or more specified nodes generally allows a user to specify a starting point from which a traversal of the graph is to begin. The object graph may be a disconnected graph for which no global root node is defined or a connected graph having a defined root node. However, any node in the graph may be considered a root node for traversal of the object graph. The system can begin traversal of the object graph from the one or more specified nodes independently. If the specified nodes do not include the global root node of the graph (e.g., for a connected graph having a defined global root node), the system may traverse one or more subgraphs of the object graph (e.g., subgraphs associated with each of the specified nodes).

At block 120, the system generates a root context object and traversal context objects associated with a root node of the object graph. The root context object may wrap a null object and a specified set of context variables that can be read and/or modified by traversal context objects and an object discovery mechanism as the graph is traversed and relationships between objects in the object graph are enumerated. The context variables may be, for example, variables used to initiate an operation with respect to the object graph and which other objects can read and modify while the operation executes. The traversal context object may wrap or otherwise be associated with objects corresponding to the specified nodes in the object graph from which the traversal of the object graph is initiated. These traversal context objects may serve as a wrapper in which a node from the object graph is encapsulated (e.g., a container in which an object associated with the node from the object graph is stored and can be acted upon during traversal operations) and in which additional information may be maintained for building a sequence of objects representing a traversal of the graph. This additional information may include, for example, values of local variables associated with the node in the object graph, links to parent traversal context objects representing parent nodes in the object graph, and so on.

For a traversal context object that is associated with the root node of the object graph or a specified node from which a traversal is to begin, the traversal context object may include a predefined barrier value for the traversal context object's link to a parent node. The predefined barrier value may, for example, define one or more values or conditions that may cause termination of a traversal process. In some embodiments, where a node in an object graph has multiple parent objects, the traversal context object may include a list or other data structure identifying objects in the object graph that are parent objects, directly or indirectly (e.g., parent, grandparent, great grandparent, etc.), to the object wrapped in the traversal context object.

At block 130, the system links the traversal context object to the root context object. By linking the traversal context object associated with the object from which traversal of the object graph is to be initiated, the system can designate the root context object as the parent of the traversal context object and thus, the ultimate parent object of any objects enumerated during traversal of the object graph.

At block 140, the system adds the traversal context object to a traversal data structure. The traversal data structure is generally used, as discussed in further detail below, to identify objects to process (e.g., enumerate relationships with other objects) during graph traversal.

In some embodiments, the traversal data structure may be a data structure in which a specified object is removed from the data structure. For example, the traversal data structure may be a queue in which the first object inserted into the data structure (e.g., the earliest enqueued object) is the first removable object that is removed (e.g., dequeued) from the data structure or a stack in which the last object inserted into the data structure (e.g., the last object pushed onto the data structure) is the first removable object that is removed (e.g., popped) from the data structure. Subsequent traversal context objects added to the traversal data structure may represent child nodes discovered during traversal of the object graph.

At block 150, the system traverses the graph by adding and removing traversal context objects to and from the traversal data structure until a terminating event occurs.

Each traversal context object added to or removed from the traversal data structure may be associated with an object in the object graph discovered using a child object discovery function defined for the object graph, as discussed in further detail below. The child object discovery function may be defined by the developer of the object graph and may be provided to the system with a request to traverse the graph such that the system may provide a generic harness that allows for the execution of any provided discovery function without coupling the system to a specific implementation or definition of a graph.

A terminating event may include, for example, detecting that the traversal data structure is empty (e.g., that no further objects remain for analysis) or detecting the injection of a terminating instruction into the traversal process.

Generally, to traverse the graph, the system may remove a traversal context object from the traversal data structure so that the size of the traversal data structure decreases as fewer objects remain for analysis during traversal of the object graph and enumeration of relationships between objects in the object graph. As discussed, the traversal context object may be removed by dequeuing an object from a queue or other first in, first out data structure or by popping an object from the top of a stack or other last in, first out data structure. The retrieved traversal context object may wrap, encapsulate, or otherwise be associated with a specific object to be analyzed from the object data graph.

The traversal context objet may be associated with a traversal context, such as a post-order context, a back-reference context, or a pre-order context.

Generally, a post-order context may represent a context for objects processed after child objects are inserted into the traversal data structure.

A back-reference context generally represents a scenario in which the object has previously been analyzed. In such a case, the system can determine that a cycle exists in a graph based on a traversal history stored in an object history data structure. For example, given a traversal history of objects A, B, C, and A, the system can determine, once object A is encountered twice in the traversal, that A→B→C→A represents a cyclic portion of the object graph. Because further traversal would result in traversing through the cyclic portion of the graph, which may unnecessarily use computing resources that could be used for other operations, the system can terminate (or abort) traversal of a cyclic portion of the graph and proceed to enumerate relationships between other objects in the object graph.

Finally, a pre-order reference may represent a context for an object initially discovered while traversing through the graph.

Generally, the request to traverse the object graph may include a discovery mechanism that includes instructions for processing objects discovered in the object graph. The discovery mechanism may be executable code associated with the object graph that defines, for example, how relationships between objects are enumerated, how objects are to be processed, and the like. In some embodiments, the discovery mechanism may further include code that allows for the execution of various functions with respect to context variables defined in the root context object.

The context variables, for example, may represent a set of values input into a system used to execute operations using the object graph, and the discovery mechanism may allow for variables in the root context object and/or any direct or indirect parent traversal context objects of a given traversal context object to be retrieved and modified. The discovery mechanism may modify the values of these variables locally, in a traversal context object associated with the object in the object graph being processed, or globally, by modifying the value of a variable in the root context object or any of the direct or indirect parent traversal context objects (e.g., based on properties of an object in the object graph, such as functions exposed by the object or other information identifying how the object uses and/or modifies the variables in the root context object or any of the direct or indirect parent traversal context objects).

In some embodiments, the discovery mechanism may provide code that performs or executes one or more actions based on the determined context of a traversal context object. Generally, the discovery mechanism may provide code that is executed when the traversal context is a post-order context and when a traversal context is a pre-order context that performs one or more user-defined actions with respect to the object being analyzed (e.g., executing one or more functions exposed by the function, retrieving and/or modifying context variables in the root context object or direct or indirect parent objects, etc.). The code executed when the traversal context is a post-order context and when the traversal context is a pre-order context may include code for obtaining an indication of whether traversal of the object graph is to be continued. If the traversal is to be discontinued (e.g., due to a timeout event, manual indication that the traversal is to be discontinued, or other terminating event unrelated to the number of objects remaining in the traversal data structure), the discovery mechanism may indicate, to the system that is traversing the object graph and enumerating relationships between objects in the object graph, that traversal is to be terminated. The indication may be, for example, a flag set in a reserved location in memory, a variable passed to a traversal function at the system, or other indication that the system can read to determine that traversal is to be discontinued.

The discovery mechanism may also provide code that performs one or more actions with respect to an object in the object graph associated with a traversal context object having a pre-order traversal context and enumerates the children objects of the object. As with the code in the discovery mechanism for traversal context objects for post-order and back-reference traversal contexts, the discovery mechanism may include code that performs one or more user-defined actions with respect to the object being analyzed (e.g., executing one or more functions exposed by the function, retrieving and/or modifying context variables in the root context object or direct or indirect parent objects, etc.). The discovery mechanism may also provide code that discovers child objects of a given object in the object graph. In some embodiments, the code for discovering child objects of a given object in the object graph may implement a depth-first search or breadth-first search based on the structure of the traversal data structure. For example, if the traversal data structure is a last-in, first-out structure, the code for discovering the child objects of a given object in the object graph may implement a depth-first search. Similarly, if the traversal data structure is a first-in, first-out structure, the code for discovering the child objects of a given object in the object graph may implement a breadth-first search.

In some embodiments, when an object is encountered with a pre-order context, the system can determine whether to enumerate child objects in the object graph based on an action value obtained after execution of the pre-order actions. If the obtained action indicates that traversal is to be aborted, the children objects of the object associated with the traversal context object may not be enumerated, and the system may analyze an object that has previously been inserted into the traversal data structure or terminate traversal operations if the traversal data structure is empty. Otherwise, the child discovery code may execute and identify one or more objects in the object graph to analyze.

The system can generate traversal context objects for each of the discovered child objects of the object associated with the current traversal context object being analyzed. Each of these traversal context objects may reference the current traversal context object as the parent traversal context object. The traversal context objects for each of the discovered child objects may then be inserted into a traversal data structure for subsequent analysis, as discussed above. Additionally, the current traversal context object may be added to the traversal data structure, and the context of the current traversal context object may be set to a post-order context so that post-order processing can subsequently be performed with respect to the current traversal context object.

In some examples, the object graph traversal techniques discussed herein may be used in a distributed computing environment in which multiple services or microservices execute to perform one or more tasks in the distributed computing environment. Each service or microservice in the distributed computing environment may maintain, manage, or otherwise be responsible for one or more objects in the object graph. Further, each service or microservice may receive a message for processing which includes a payload having one or more objects defined in the object graph.

To process an incoming message, a receiving service or microservice may extract the payload of the message and identify one or more services that are to process an object included in the payload of the message. The object included in the payload of the message may be identified, for example, based on a name of the object, a globally or universally unique identifier associated with the object, or the like. The object included in the payload of the message may be input into an object graph traverser as the initial object from which a traversal is to be performed. As discussed above the object graph traverser can traverse the object graph from the object included in the payload of the message to discover related objects in the object graph and, based on externally maintained metadata related to each object in the object graph, the service or microservice in the distributed computing environment that is to process a command with respect to the discovered related objects.

Generally, traversal of the object graph may thus be used to coordinate execution of a command in a distributed computing environment across a plurality of services or microservices. In some embodiments, traversal of the object graph may be used to determine an order in which operations are performed within the distributed computing environment in order to process a message received by the receiving service. For example, operations may be executed or routed for execution to the appropriate service as parent-child relationships between different objects are enumerated during traversal of the object graph (e.g., such that objects are written, updated, or otherwise processed in a manner that preserves parent-child relationships and ensures that child objects that a parent object depends on exist before the parent object is processed).

Example Object Graph and Traversal Data Structures

Figure 2:
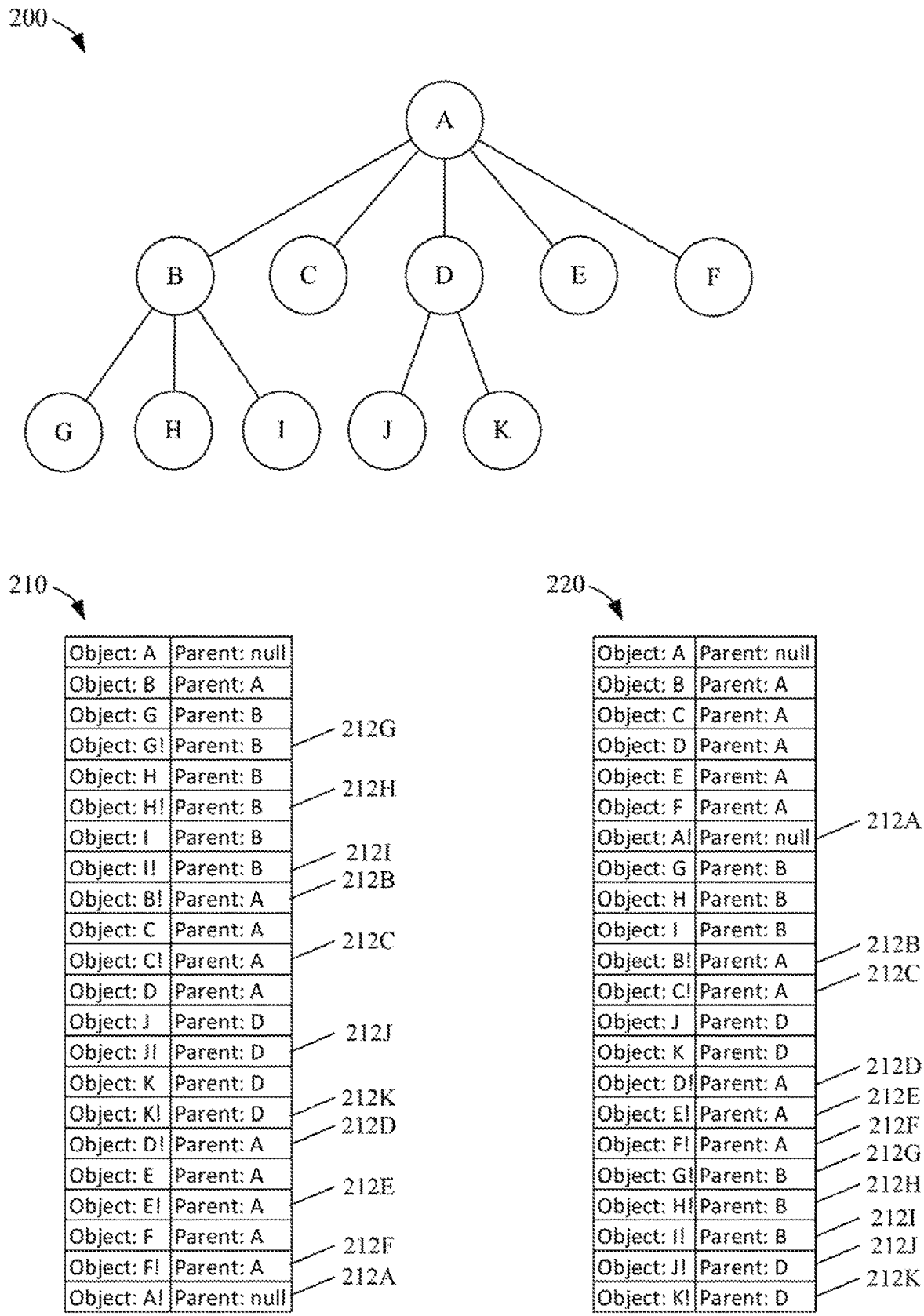
FIG. 2 illustrates an example object graph and traversal data structures illustrating traversals of the object graph.

FIG. 2 illustrates an example object graph and example queues representing an order in which objects in the object graph are traversed using the traversal context objects discussed herein.

As illustrated, object graph 200 includes a root node associated with object A. Root node associated with object A has children nodes associated with objects B, C, D, E, and F. Of these children nodes of the root node, the nodes associated with objects B and D have their own children nodes, and the nodes associated with objects C, E, and F do not have any further children nodes.

Queue 210 represents a queue generated by traversing object graph 200 using a depth-first traversal from the root node of object graph 200 using the traversal context objects and traversal function discussed above. Each row in queue 210 may represent an individual traversal context object associated with a particular object in object graph 200 indicating that these nodes have been visited while traversing the graph. As discussed, the contents of queue 210 may be used to track a history of objects visited during graph traversal and determine, for example, whether a back-reference context exists for an object in the object graph.

As illustrated, the first entry in queue may be a traversal context object that encapsulates object A and includes information identifying object A as the root node of the object graph 200 (i.e., that object A does not have any parent nodes) In a depth-first traversal, traversal objects may be added as continuous paths to the bottom of the object 200 are identified. For example, the next object discovered may be object B, which, as discussed, has child objects G, H, and I, each of which are at the bottom of a path through object graph 200.

Thus, a traversal function can generate and add a traversal context object associated with object B and identifying object A as the parent object to queue 210, and then generate and add a traversal a traversal context object associated with object G and identifying object B as the parent object to queue 210. At this point, a traversal may attempt to identify child nodes of object G in object graph 200 and return an empty set, since object G does not include any child nodes. To signify that traversal has terminated with respect to object G, a special traversal context object may be inserted into the queue. As illustrated, the special traversal context object 212G, represented as object G!, may have the same parent object as object G and may include a special character or other designator (e.g., the exclamation point character, "!") indicating that the traversal context object is a special traversal context object.

Similar actions may be performed with respect to objects H and I, and after objects G, H, and I are processed and added to the queue, it may be determined that traversal has been completed for object B. A terminating special traversal context object may thus be added to the queue for object B. Other traversal context objects, represented by each row in queue 210, may be added as the object graph 200 is traversed, resulting in the entries illustrated in queue 210. That is, in queue 210 illustrated for a depth-first traversal of the object graph 200, additional traversal objects may be added for object C, object D and its children objects (including objects J and K), object E, and object F.

Queue 220 represents a queue generated by traversing object graph 200 using a breadth-first traversal from the root node of object graph 200 using the traversal context objects and traversal function discussed above.

In this example, terminating entries may be added after all child nodes of a given node in the graph have been reached. Thus, a special traversal context object 212A terminating traversal with respect to a node A in the graph, may be added for the root node associated with object A after traversal context objects for objects B, C, D, E, and F have been added to the queue. Subsequently, the next level of the graph may be traversed from the traversal context objects for the child objects of objects B, C, D, E, and F, respectively. Entries including terminating context objects 212B-212F may be added after the children of objects B, C, D, E, and F are added to the queue. Finally, entries including terminating context objects 212G-212K may be added for each of the objects at the bottom level of the object graph 200, resulting in the entries illustrated in queue 220.

In some embodiments, queues 210 and 220 may be maintained in parallel with a traversal data structure that tracks the nodes remaining for further traversal during the traversal of the graph (e.g., nodes for which a determination of whether child nodes exist has not been made). Generally, as a system finishes traversing the child objects of a given node, the given node may be removed from the tracking data structure. In some cases, objects may be dequeued from the tracking data structure when the special traversal context object is inserted into queue 210 or queue 220 (depending on whether object graph 200 is being traversed using depth-first or breadth-first techniques).

For example, in a depth-first traversal, the tracking data structure may be a stack or other last-in, first-out structure in which the last entry to be added to the data structure is the first entry to be removed from the structure. In a breadth-first traversal, the tracking data structure may be a queue or other first-in, first-out structure in which the first entry to be added to the data structure is the first entry to be removed from the structure. Generally, when the tracking data structure is empty, the system can determine that no further traversal of object graph 200 need be performed, as object graph 200 has been traversed in its entirety or has reached a user-defined terminating condition.

Traversal of an object graph may be organized in a loop that terminates when the traversal data structure is empty. During execution of the loop, traversal code may determine the next instruction to execute (e.g., the next traversal context to consume) by removing a first removable object from the traversal data structure (e.g., by dequeuing an object from a queue or popping an object from a stack). Depending on the context of the traversal context object, the next set of instructions may be pushed onto the tail of the traversal data structure or enqueued at the tail of the traversal data structure.

Figure 3:
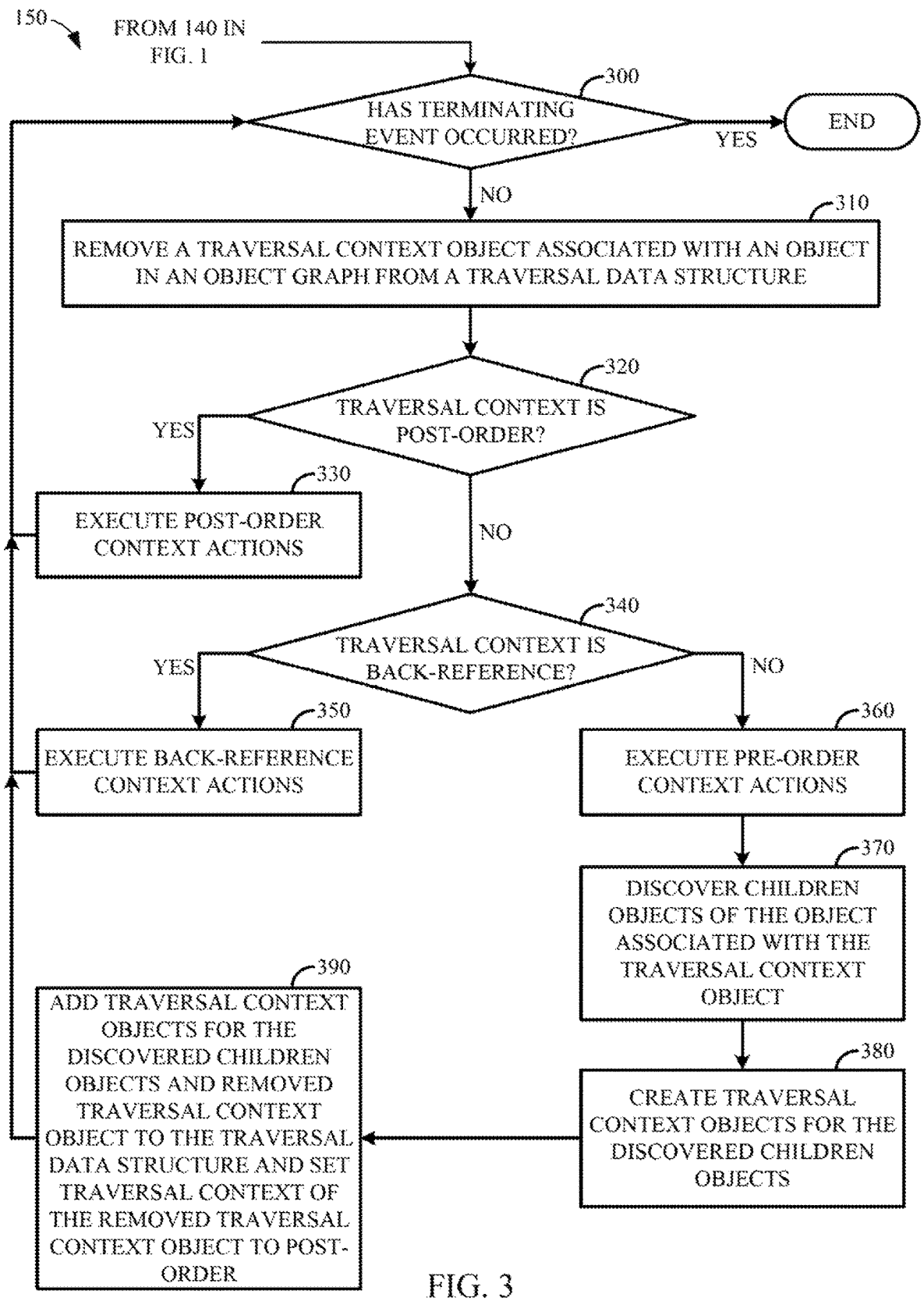
FIG. 3 illustrates example operations for traversing an object graph based on traversal context objects and a traversal context associated with objects in the object graph.

Example Operations for Identifying Child Nodes to Continue Traversal of an Object Graph FIG. 3 illustrates further details regarding operations 150 (illustrated in FIG. 1) for traversing an object graph based on the child objects of a given object in the object graph.

As illustrated, operations 150 begin at block 300, where the system determines whether a terminating event has occurred. As discussed, a terminating event may include an indication to quit the traversal process after executing one or more actions for a given traversal context object or if the traversal data structure is empty. If a terminating event has occurred, then operations 150 may terminate.

Otherwise, one or more objects may exist for analysis in the traversal data structure. Operations 150 may proceed to block 310, where the system removes a traversal context object associated with an object in the object graph from the traversal data structure. The system may remove an object from the traversal data structure based on the type of data structure used to store traversal context objects for analysis. If the traversal data structure is a first-in, first-out data structure (e.g., a queue), the system can dequeue the oldest object from the traversal data structure. Otherwise, if the traversal data structure is a last-in, first-out data structure (e.g., a stack), the system can pop the newest object from the traversal data structure.

At block 320, the system determines if the traversal context of the traversal context object is a post-order context. A post-order context, as discussed, generally represents a context processed after children objects of the given object (if any) have been inserted into the traversal data structure.

If, at block 320, the system determines that the traversal context of the traversal context object is a post-order context, operations 150 may proceed to block 330, where the system executes post-order context actions with respect to the traversal context object. The post-order context actions may be defined, for example, in a discovery mechanism provided to the system for use while enumerating relationships between objects in the object graph. After executing the post-order context actions, operations 150 may return to block 300 for a determination of whether a terminating event has occurred.

Otherwise, where the traversal context is not a post-order context operations 150 may proceed to block 340, where the system determines whether the traversal context is a back-reference context. The system can determine that the traversal context is a back-reference context, for example, if the object associated with the traversal context object has previously been encountered during traversal of the object graph and enumeration of relationships between objects in the object graph.

If, at block 340, the system determines that the traversal context is a back-reference context, operations 150 may proceed to block 350, where the system executes back-reference context actions with respect to the traversal context object. As discussed, the back-reference context actions may be defined in in a discovery mechanism provided to the system for use while enumerating relationships between objects in the object graph. The back-reference context actions may generally include one or more actions to terminate further traversal of objects from the object associated with the traversal context, as further traversal may result in the execution of an infinite loop. After executing the back-reference context actions with respect to the traversal context object, operations 150 may return to block 300 for a determination of whether a terminating event has occurred.

Otherwise, if at block 340, the system determines that the traversal context is neither a post-order context nor a back-reference context, the system can determine that the traversal context is a pre-order context corresponding to a newly discovered object. Operations may proceed to block 360, where the system executes pre-order context actions with respect to the traversal context object. Like the post-order context actions and the back-reference context actions discussed above, the pre-order context actions may be defined in a discovery mechanism provided to the system for use while enumerating relationships between objects in the object graph.

At block 370, the system discovers children objects of the object associated with the traversal context object. As discussed, the system can discover these children objects based on child discovery techniques defined in the discovery mechanism and the structure of the traversal data structure used to traverse the object graph. For example, the system can discover child objects using a depth-first search if the traversal data structure is a stack or other last-in, first-out data structure and can discover child objects using a breadth-first search if the traversal data structure is a queue or other first-in, first-out data structure.

At block 380, the system creates traversal context objects for the discovered children objects in the object graph, if any exist. As discussed, the traversal context objects may wrap, encapsulate, or otherwise be associated with the discovered children objects. Each of the traversal context objects created for the discovered children objects in the object graph may be linked with the traversal context object associated with the parent object of the discovered children objects in the object graph. By linking the traversal context objects created for the discovered children objects to the traversal context object of the parent object in the object graph, the system can allow for various operations to be performed with respect to context variables maintained in the ultimate root context object or any direct or indirect parent objects of the created traversal context objects.

At block 390, the system adds the traversal context objects for the discovered children objects to the traversal data structure and adds the removed traversal context object back to the traversal data structure. Generally, in adding the traversal context objects for the discovered children objects and the removed traversal context object to the traversal data structure, the system sets the context of the removed traversal context object to a post-order context. In setting the context of the removed context object to a post-order context, the system can indicate implicitly that the object in the graph associated with the removed context object has previously been encountered during traversal of the object graph, and thus that a child discovery operation need not be executed again with respect to the removed traversal context objects. After adding the traversal context objects for the discovered children objects and the removed traversal context object to the traversal data structure, operations 150 may return to block 300, where the system determines whether to proceed with traversing the object graph based on the number of data objects in the traversal data structure and the traversal data structure is empty (which, after having added the traversal context objects for the discovered children objects and the removed traversal context object to the traversal data structure, is resolved in the negative) or whether another terminating event has occurred.

Example System for Traversing an Object Graph Using Traversal Context Objects

Figure 4:
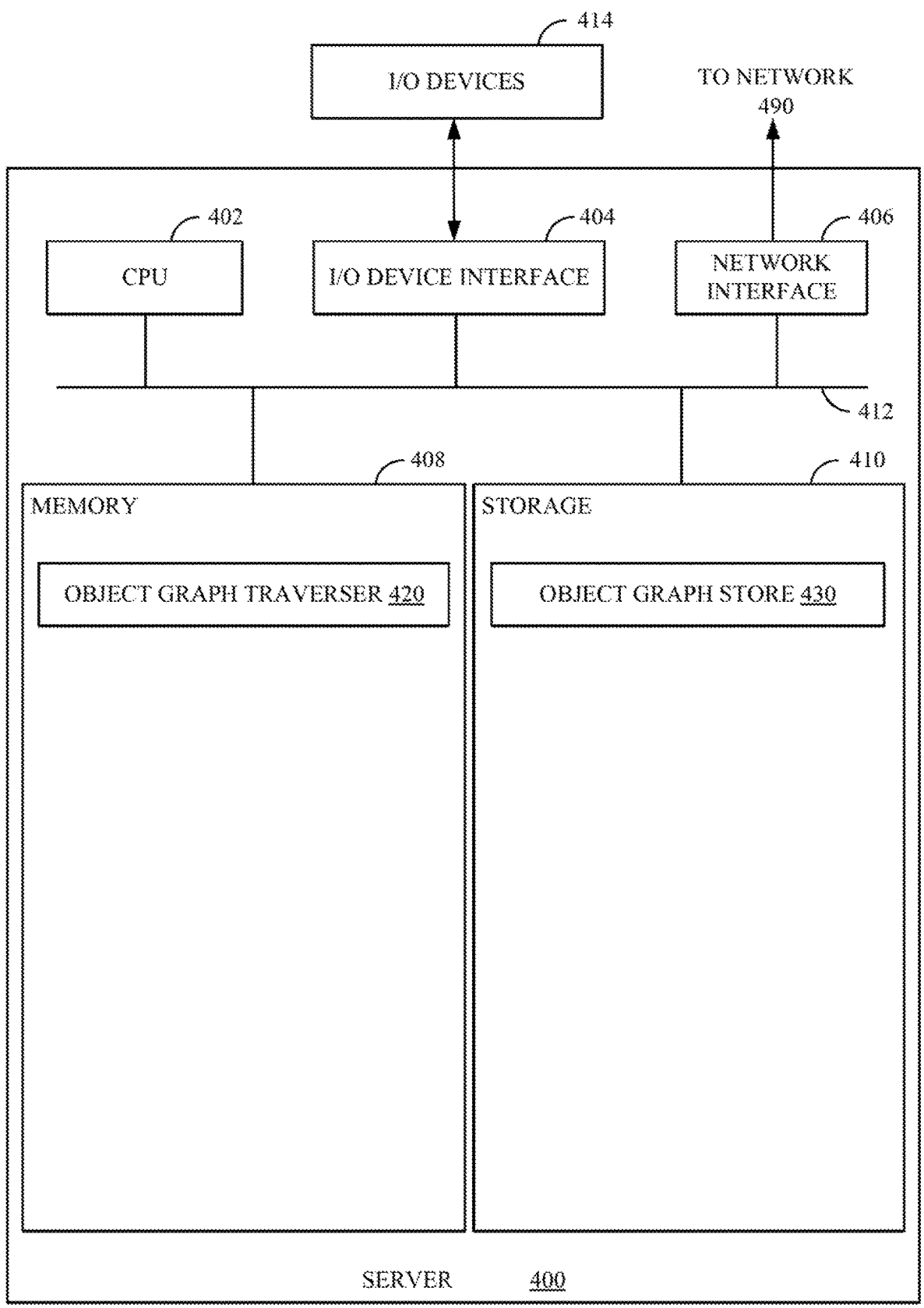
FIG. 4 illustrates an example computing system with which embodiments of the present disclosure may be implemented.

FIG. 4 illustrates an example system 400 that can traverse an object graph using traversal context objects that are implementation-agnostic and can be used to traverse an object graph regardless of the definition of the graph or the objects stored therein. System 400 may be a server, cluster of servers, one or more virtual machines executing in a distributed computing environment, desktop computer, laptop computer, mobile phone, or other device on which application code can be executed.

As shown, system 400 includes a central processing unit (CPU) 402, one or more I/O device interfaces 404 that may allow for the connection of various I/O devices 414 (e.g., keyboards, displays, mouse devices, pen input, etc.) to the client 400, network interface 406 through which system 400 is connected to network 490 (which may be a local network, an intranet, the internet, or any other group of computing devices communicatively connected to each other), a memory 408, storage 410, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 404, memory 408, and storage 410.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like.

As shown, memory 408 includes an object graph traverser 420. Object graph traverser 420 generally uses traversal context objects and a discovery mechanism to traverse an object graph (e.g., stored in object graph store 430 or received from a remote system) and enumerate relationships between objects in the object graph. To traverse an object graph, object graph traverser 420 generally receives a request to traverse a specified object graph including a definition of a discovery mechanism and one or more nodes in the object graph from which a traversal is to be initiated. The discovery mechanism may define a traversal data structure and a discovery function used to find children objects and contexts for a given parent object and context. The traversal data structure and discovery function may, for example define that the traversal is to be performed using a depth-first search (where the traversal data structure is a first-in, first-out structure) or a breadth-first search (where the traversal data structure is a last-in, first out structure). The request may further include information about an initial set of variables, an initial result value, a lookup function, and a mechanism for creating traverser context object instances. A traversal context object is generated for each of the identified one or more nodes from which the traversal is to be initiated and added to the traversal data structure. Object graph traverser 420 can use the context of an object removed from the traversal data structure to determine what actions to perform. Generally, where the context is a pre-order context, the system can execute a child discovery function with respect to an object to identify additional objects to process from the object graph. Traversal operations may terminate when the traversal data structure is empty or another terminating event occurs.

Storage 410 is representative of a non-volatile memory, such as a disk drive, solid state drive, or a collection of storage devices distributed across multiple storage systems. Although shown as a single unit, the storage 410 may be a combination of fixed and/or removable storage devices, such as fixed disc drives, removable memory cards or optical storage, network attached storage (NAS), or a storage area-network (SAN). Storage 410, as illustrated, may include an object graph store 430. Object graph store 430 generally represents a data repository in which information about an object graph may be stored. This information may include, for example, schema files in various schema languages (e.g., JavaScript Object Notation (JSON), eXtendible Markup Language (XML), or the like), or other files defining an object graph. In some embodiments, a copy of the object graph being analyzed may be maintained by object graph traverser 420 in memory 408, and object graph store 430 may store child objects and/or portions of a traversal data structure so that memory 408 is available for other operations executing on system 400.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for enumerating relationships between objects in an object graph, comprising:
   receiving a request to traverse an object graph, the object graph including a plurality of objects;
   generating a root context object;
   generating a traversal context object associated with a root node of the object graph;
   linking the traversal context object to the root context object;
   adding the traversal context object to a traversal data structure; and
   traversing the object graph by adding and removing traversal context objects to and from the traversal data structure until a terminating event occurs, wherein traversing the object graph comprises:
   removing the traversal context object from the traversal data structure;
   determining a traversal context of the traversal context object; and
   executing one or more actions to process the traversal context object based on the determined traversal context.

2. The method of claim 1, wherein the request to traverse the object graph includes an initial set of context variables that can be modified by traversal context objects associated with objects in the object graph during traversal of the graph.

3. The method of claim 1, wherein the request includes a discovery mechanism having instructions for processing objects discovered in the object graph.

4. The method of claim 3, wherein the discovery mechanism comprises code for modifying one or more variables in the root context object based on properties of an object in the object graph.

5. The method of claim 3, wherein:
the traversal context comprises a post-order context; and
executing the one or more actions to process the traversal context object comprises:
  executing one or more actions defined in the discovery mechanism for processing objects using the post-order context; and
  removing a first removable object from the traversal data structure for further analysis.

6. The method of claim 3, wherein:
determining the traversal context of the traversal context object comprises determining that the traversal context corresponds to a back-reference context based on determining that the traversal context object has previously been removed from the traversal data structure; and
executing the one or more actions comprises:
  executing one or more actions defined in the discovery mechanism for processing objects using the back-reference context; and
  removing a first removable object from the traversal data structure for further analysis.

7. The method of claim 3, wherein:
the traversal context comprises a pre-order context; and
executing the one or more actions to process the traversal context object comprises:
  discovering, in the object graph, children objects of an object from the object graph associated with the traversal context object;
  generating traversal context objects for the discovered children objects; and
  adding the generated traversal context objects to the traversal data structure.

8. The method of claim 7, further comprising:
adding the removed traversal context object to the traversal data structure; and
setting a traversal context of the removed traversal context to a post-order context.

9. The method of claim 1, wherein:
the request comprises a request received at one of a plurality of services in a distributed computing environment to process a message; and
traversing the object graph comprises:
  for each respective object added to the traversal data structure:
    generating a message to instruct a service associated with the respective object to process a command with respect to the respective object, and
    routing the message to the service associated with the respective object for processing.

10. A system, comprising:
a memory having executable instructions stored thereon; and
a processor configured to execute the executable instructions to cause the system to
  receive a request to traverse an object graph, the object graph including a plurality of objects,
  generate a root context object,
  generate a traversal context object associated with a root node of the object graph,
  link the traversal context object to the root context object,
  add the traversal context object to a traversal data structure, and
  traverse the object graph by adding and removing traversal context objects to and from the traversal data structure until a terminating event occurs, wherein in order to traverse the object graph, the processor is configured to cause the system to:
    remove the traversal context object from the traversal data structure;
    determine a traversal context of the traversal context object; and
    execute one or more actions to process the traversal context object based on the determined traversal context.

11. The system of claim 10, wherein the request to traverse the object graph includes an initial set of context variables that can be modified by traversal context objects associated with objects in the object graph during traversal of the graph.

12. The system of claim 10, wherein the request includes a discovery mechanism having instructions for processing objects discovered in the object graph.

13. The system of claim 12, wherein the discovery mechanism comprises code for modifying one or more variables in the root context object based on properties of an object in the object graph.

14. The system of claim 12, wherein:
the traversal context comprises a post-order context; and
in order to execute the one or more actions to process the traversal context object, the processor is configured to cause the system to:
  execute one or more actions defined in the discovery mechanism for processing objects using the post-order context; and
  remove a first removable object from the traversal data structure for further analysis.

15. The system of claim 12, wherein:
in order to determine the traversal context of the traversal context object, the processor is configured to cause the system to determine that the traversal context corresponds to a back-reference context based on determining that the traversal context object has previously been removed from the traversal data structure; and
in order to execute the one or more actions, the processor is configured to cause the system to:
  execute one or more actions defined in the discovery mechanism for processing objects using the back-reference context; and
  remove a first removable object from the traversal data structure for further analysis.

16. The system of claim 12, wherein:
the traversal context comprises a pre-order context; and
in order to execute the one or more actions to process the traversal context object, the processor is configured to cause the system to:
  discover, in the object graph, children objects of an object from the object graph associated with the traversal context object;
  generate traversal context objects for the discovered children objects; and
  add the generated traversal context objects to the traversal data structure.

17. The system of claim 16, wherein the processor is further configured to cause the system to:
add the removed traversal context object to the traversal data structure; and
set a traversal context of the removed traversal context to a post-order context.

18. A method for enumerating relationships between objects in an object graph, comprising:
receiving a request to traverse an object graph, wherein:
  the object graph includes a plurality of objects, and the request includes a specification of a discovery mechanism defining functions for processing objects discovered in the object graph based on a context of the discovered objects and initial set of context variables for traversing the object graph;

generating a root context object;

generating a traversal context object associated with a root node of the object graph;

linking the traversal context object to the root context object;

adding the traversal context object to a traversal data structure; and traversing the object graph by adding and removing traversal context objects to and from the traversal data structure until a terminating event occurs, wherein traversing the graph comprises:

for each respective object in the traversal data structure, performing one or more of the defined functions in the discovery mechanism with respect to the respective object, and upon determining that the respective object has a pre-order traversal context:

discovering one or more children objects in the object graph, generating traversal context objects for the discovered children objects, and adding the generated traversal context objects to the traversal data structure.

\* \* \* \* \*